(12) United States Patent
Sloan et al.

(10) Patent No.: US 7,714,225 B2
(45) Date of Patent: May 11, 2010

(54) MODULAR POWER SUPPLY

(75) Inventors: Thomas C. Sloan, Santa Barbara, CA (US); Bruce Quaal, Ventura, CA (US)

(73) Assignee: SloanLED, Inc., Ventura, CA (US)

( * ) Notice: Subject to any disclaimer, the term of this patent is extended or adjusted under 35 U.S.C. 154(b) by 790 days.

(21) Appl. No.: 11/607,560

(22) Filed: Nov. 30, 2006

(65) Prior Publication Data

US 2008/0084656 A1    Apr. 10, 2008

Related U.S. Application Data

(60) Provisional application No. 60/828,358, filed on Oct. 5, 2006.

(51) Int. Cl.
*H02G 3/08174* (2006.01)

(52) U.S. Cl. .............. 174/50; 174/24; 174/54; 174/58; 174/64; 174/135; 439/535; 248/906

(58) Field of Classification Search ............ 174/24, 174/40 R, 41, 44, 45 R, 45 TD, 481, 54, 58–64, 174/50, 135; 439/535; 248/906; 220/4.02
See application file for complete search history.

(56) References Cited

U.S. PATENT DOCUMENTS

| | | | | |
|---|---|---|---|---|
| 2,124,693 A | | 7/1938 | Fryer | .............. 274/9 |
| 2,297,824 A | * | 10/1942 | Bissell et al. | .............. 174/41 |
| 4,723,053 A | * | 2/1988 | Amaya | .............. 174/41 |
| 6,337,438 B1 | * | 1/2002 | Oyamada | .............. 174/535 |
| 6,776,504 B2 | | 8/2004 | Sloan et al. | .............. 362/240 |
| 6,932,495 B2 | | 8/2005 | Sloan et al. | .............. 362/294 |
| 6,969,179 B2 | | 11/2005 | Sloan et al. | .............. 362/219 |
| 2003/0079894 A1 | | 5/2003 | Weise et al. | |

FOREIGN PATENT DOCUMENTS

| | | |
|---|---|---|
| FR | 2353794 | 12/1977 |
| WO | WO9424748 | 10/1994 |
| WO | WO03012949 | 2/2003 |

OTHER PUBLICATIONS

PCT International Search Report and Written Opinion Dec. 14, 2007.

* cited by examiner

*Primary Examiner*—Dhiru R Patel
(74) *Attorney, Agent, or Firm*—Koppel, Patrick, Heybl & Dawson

(57) ABSTRACT

A modular power supply particularly adapted for mounting to standard junction boxes in a system to provide a solid state lighting system compatible power signal. One embodiment of a modular power supply for mounting to a junction box according to the present invention includes a housing holding internal electronic components and a first extension integral to the housing for mounting to a junction box. The extension has an opening to the interior of the housing with primary wires passing from the interior of the housing through the extension. The first extension is positioned so that the power supply is capable of being mounted to the mounting surface of a junction box when the power supply is at different orientations.

34 Claims, 9 Drawing Sheets

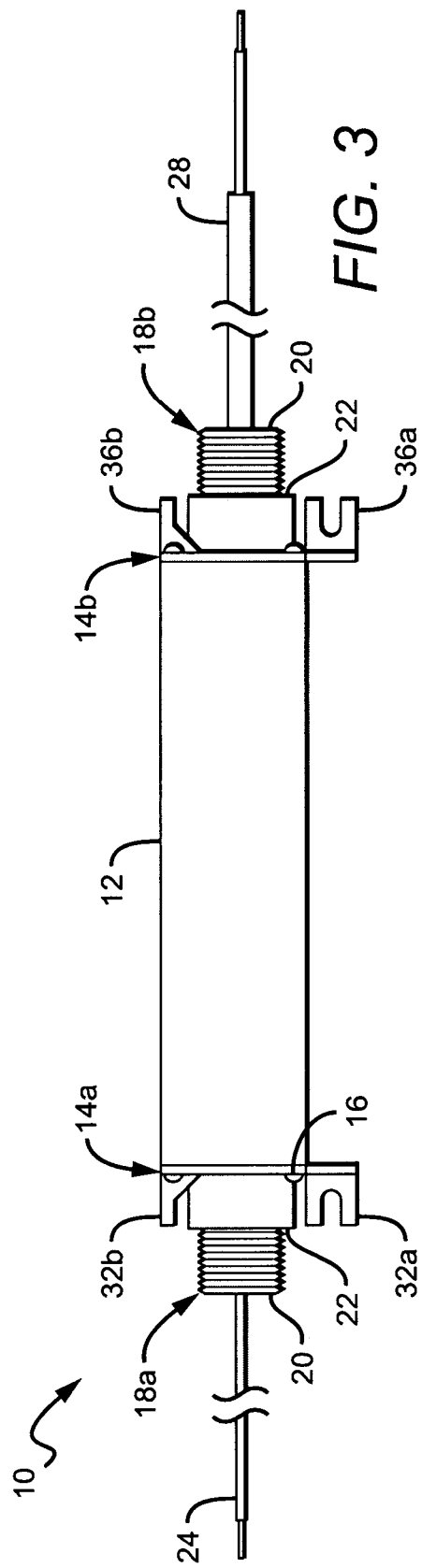
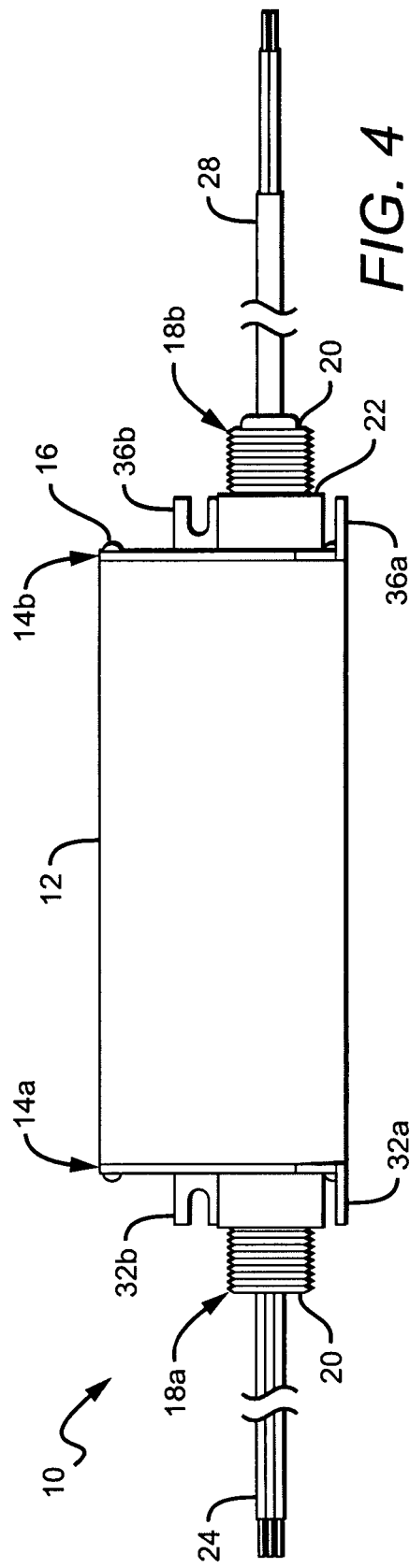

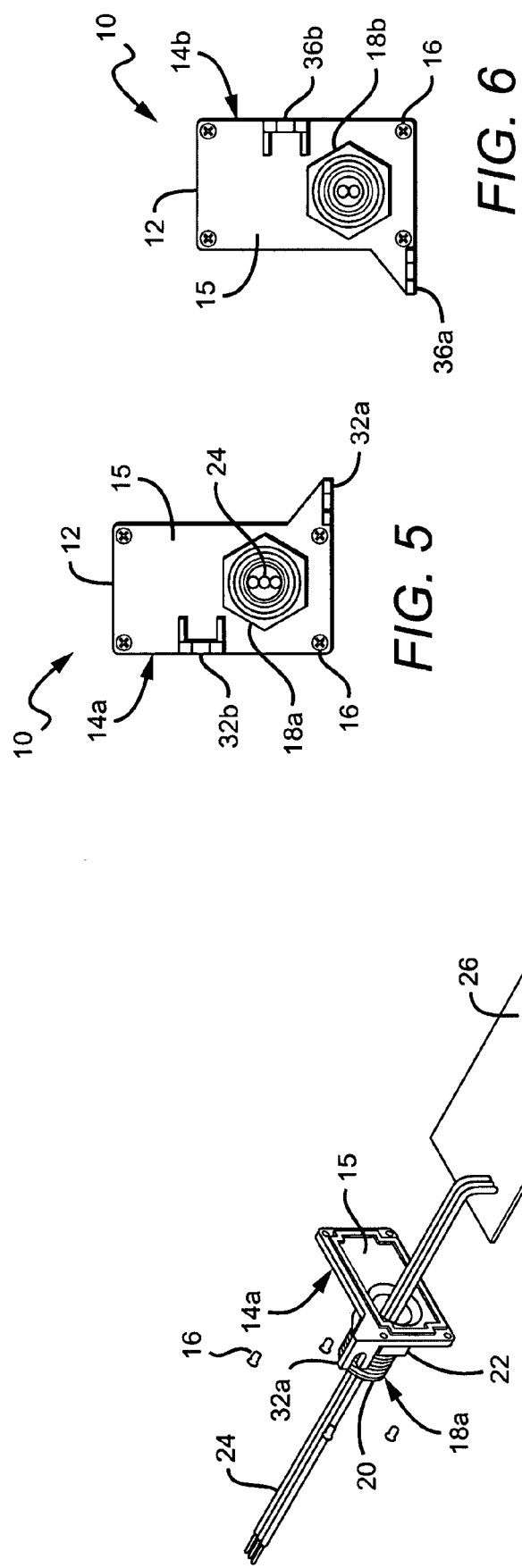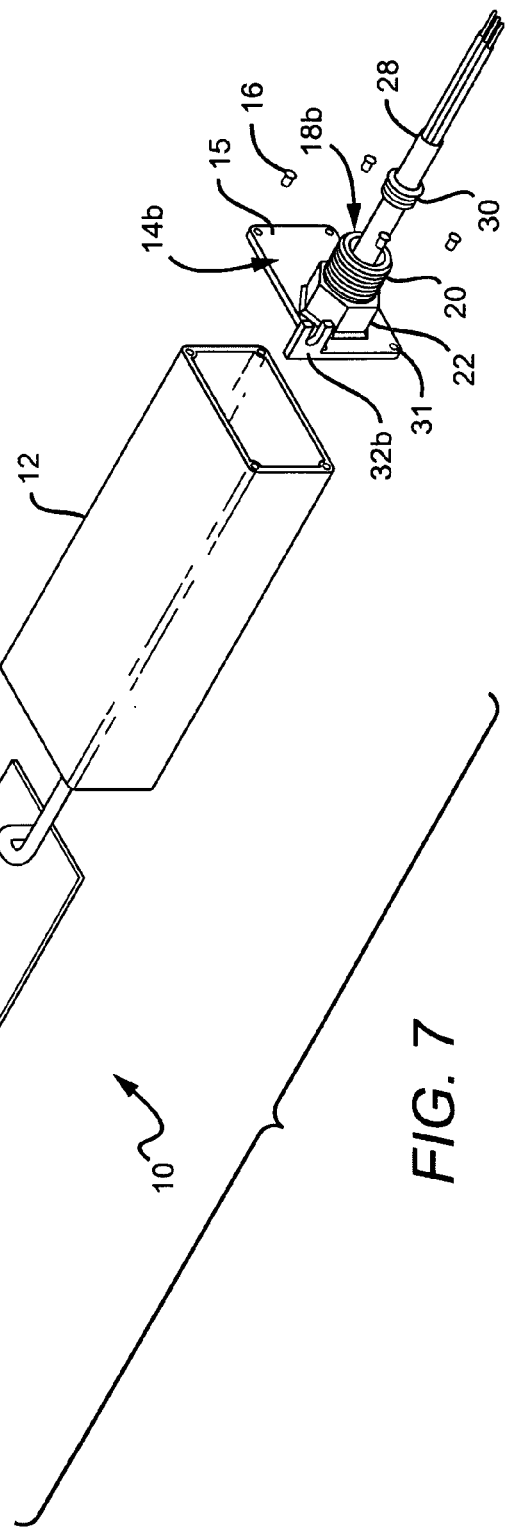

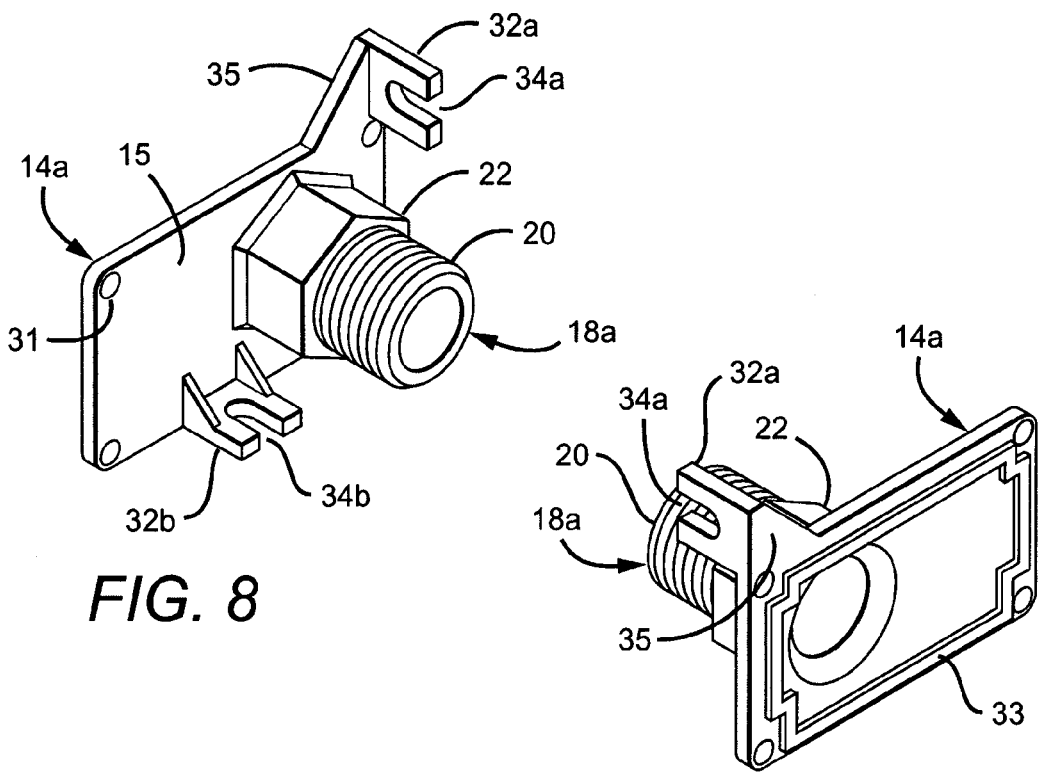
FIG. 8
FIG. 9
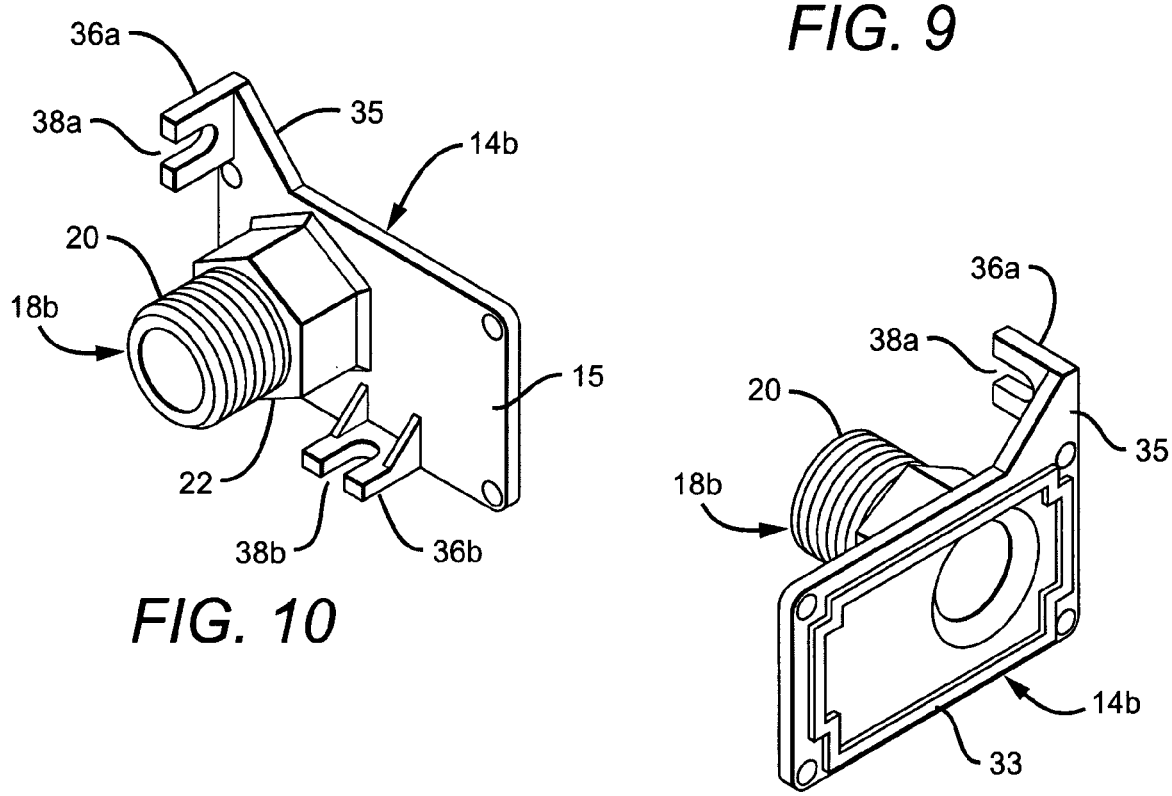
FIG. 10
FIG. 11

MODULAR POWER SUPPLY

This application claims the benefit of provisional application Ser. No. 60/828,358 to Sloan et al., which was filed on Oct. 5, 2006.

BACKGROUND OF THE INVENTION

1. Field of the Invention

This invention relates to power supplies, and more particularly to power supplies for solid state lighting systems.

2. Description of the Related Art

Light emitting diodes (LEDs) are a known class of solid state devices that convert electric energy to light. They generally comprise one or more active layers of semiconductor material sandwiched between oppositely doped layers. When a bias is applied across the doped layers, holes and electrons are injected into the active layer where they recombine to generate light. Light is emitted omnidirectionally from the active layer and from all surfaces of the LED. The useful light is generally emitted in the direction of the LED's top surface, which is usually p-type.

Developments in LED technology have resulted in devices that are brighter, more efficient and more reliable. LEDs are now being used in many different applications that were previously the realm of incandescent bulbs; some of these include architectural lighting, displays, pool/spa lighting, automobile taillights and traffic signals. As the efficiency of LEDs improves it is expected that they will be used in most lighting applications. These lighting systems are generally referred to as solid state lighting systems, and can also use other solid state lighting devices such as solid state lasers.

Some examples of solid state lighting systems are described in U.S. Pat. Nos. 6,776,504 and 6,969,179 both to Sloan et al., assigned to SloanLED, Inc. (assignee of present application), and both entitled "Perimeter Lighting Apparatus." These systems generally comprise one or more elongated perimeter lights having a linear array of light sources (LEDs) that are electrically illuminated. The LEDs are disposed within an elongated transparent tube, with the tube transmitting and dispersing the light from the LEDs giving the appearance of a continuous light source. The array of LEDs can be cut at intervals down its length to shorten it and the light sources that remain in the array continue to emit light. The tube can also be cut to match the length of said array. The perimeter lights can also be electrically coupled in a daisy chain with the electrical power at each of the perimeter lights being transmitted to the successive light. A mechanism is included for anchoring the plurality of perimeter lights to a structure to illuminate it. Each of the perimeter lights can be cut at intervals down its length while not interfering with its ability to transmit its electrical power to successive lights.

Another example of an SSL system is described in U.S. Pat. No. 9,932,495 to Sloan et al., assigned to SloanLED, Inc., and entitled "Channel Letter Lighting Using Light Emitting Diodes." These systems generally comprise a plurality of channel lighting units electrically connected to one another so that a power signal applied to the lighting system is transmitted to each of the plurality of lighting units. The units are mounted in channel letter typically having a housing in the shape of a letter. A translucent lens is included over the housing to transmit light from within the housing. A power signal applied to the first of the plurality of lighting units in the daisy chain is transmitted to the remaining of the plurality of lighting units to illuminate the channel letter.

These SSL systems are typically powered by a direct current (DC) power signal, with one example of such a signal being 12 volts DC. The power source (primary source) at many commercial and residential locations, however, is typically in the range of 100-240 volts alternating current (AC). As a result, a power supply is needed to convert the primary AC source to the appropriate DC source to drive the SSL systems. These power supplies are electrically connected to the primary source at a conventional junction box. The junction boxes have "knock-outs" to create a circular opening in the junction box for connecting wires to pass through. Connecting wires pass through the opening and are connected at one end within the junction box to the primary source. At the other end, the wires pass into the power supply and are connected to the conversion circuitry within the power supply. A conduit is usually mounted between the SSL system power supply and junction box, with the connecting wires passing through the conduit. The conduit is then connected at the ends to the solid state lighting system power supply and the junction box, with some embodiments having a watertight seal at the ends. This installation process can be complicated and cumbersome; particularly in those installations where more than one solid state lighting system power supply is connected to a junction box.

SUMMARY OF THE INVENTION

The present invention generally provides an improved modular power supply particularly adapted for mounting to standard junction boxes in a system to provide a solid state lighting system compatible power signal. One embodiment of a modular power supply for mounting to a junction box according to the present invention comprises a housing holding internal electronic components and a first extension integral to the housing for mounting to a junction box. The extension has an opening to the interior of housing with primary wires passing from the interior of the housing through the extension. The first extension is positioned so that the power supply is capable of being mounted to the mounting surface of a junction box when the power supply is at different orientations.

One embodiment of a system for providing power to a lighting system according to the present invention comprises a junction box mounted to a mounting surface and having a bottom surface adjacent to the mounting surface. The junction box is capable of accepting an electrical conductor passing into the interior of the junction box, wherein the electrical conductor carries a first electrical signal. The system further comprises a power supply capable of accepting the first electrical signal and converting the first electrical signal to a second electrical signal compatible with powering a lighting system. The power supply comprises a housing having a first extension integral for mounting the power supply to the junction box. The extension passes through a hole in the junction box wherein the first extension is positioned on the housing so that a surface of the housing is at the same level as the junction box bottom surface when the power supply is at different orientations.

The present invention also comprises power supply housing end caps, with one embodiment according to the present invention comprising an end plate capable of being mounted to a power supply housing. A cylindrical extension is included integral to the end plate and sized to fit within a junction box hole. An access hole is included in the end plate aligned with the cylindrical extension and mounting tabs are arranged integral to the end plate and arranged to allow mounting of the housing to the mounting surface of the junction box when the end cap is mounted to the housing and the cylindrical extension is fitted within the junction box hole.

These and other further features and advantages of the invention will be apparent to those skilled in the art from the following detailed description, taken together with the accompanying drawings.

BRIEF DESCRIPTION OF THE DRAWINGS

FIG. 3 is a side view of the power supply shown in FIG. 1;

FIG. 4 is a top view of the power supply shown in FIG. 1;

FIG. 5 is an end view of the power supply shown in FIG. 1;

FIG. 6 is another end view of the power supply shown in FIG. 1, from the end opposite the view shown in FIG. 5;

FIG. 7 is an exploded view of the power supply shown in FIG. 1;

FIG. 8 is a perspective view of one embodiment of an end cap according to the present invention;

FIG. 9 is an opposite side perspective view of the end cap shown in FIG. 8;

FIG. 10 is a perspective view of another embodiment of an end cap according to the present invention arranged to be mounted to the power supply housing at an end opposite the end cap shown in FIGS. 8 and 9;

FIG. 11 is an opposite perspective view of the end cap shown in FIG. 10;

DETAILED DESCRIPTION OF THE INVENTION

Figure 1:
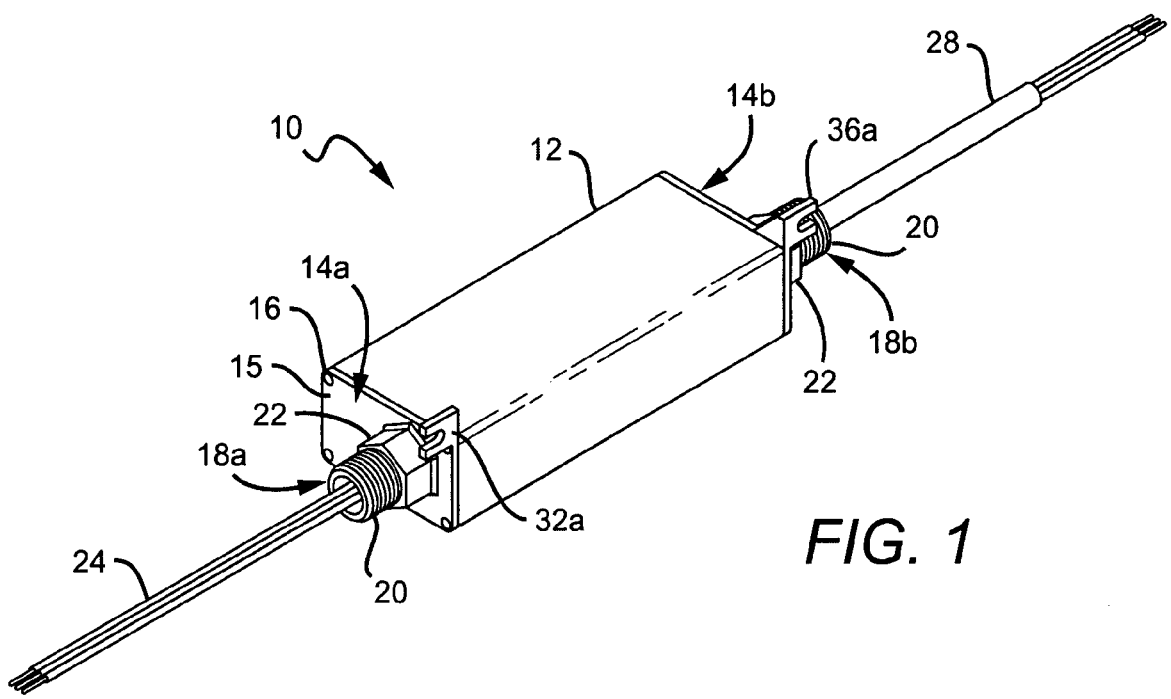
FIG. 1 is a perspective view of one embodiment of a power supply according to the present invention.
Figure 2:
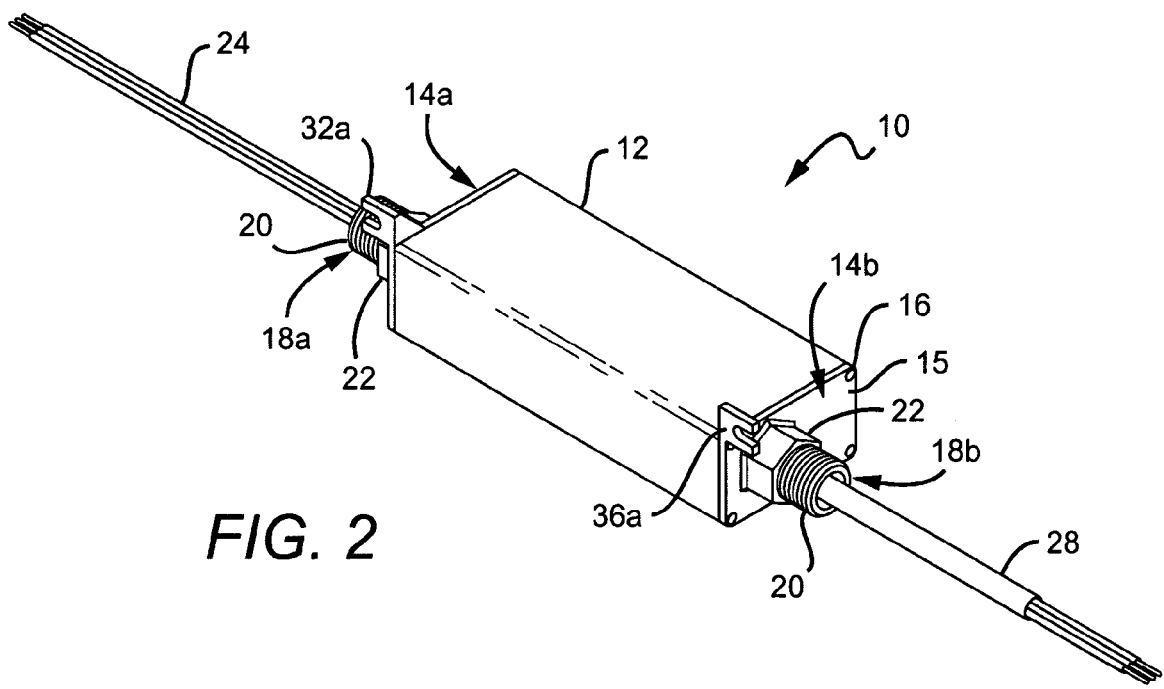
FIG. 2 is another perspective view of the power supply shown in FIG. 1.

The present invention is generally directed to an improved apparatus for attaching an assembly to a junction box, and is particularly adapted for attaching a power supply to a junction box. It is understood, however, that the invention can be used with many other assemblies and can be used for connecting to other devices beyond junction boxes. One embodiment according to the present invention is used in attaching a solid state lighting system power supply to a junction box.

Power supplies according to the present invention can be easily mounted to standard electrical junction boxes in a modular fashion. The power supply generally comprises a rectangular housing having open ends, with fittings or end caps over the open ends. It is understood, however, that in some embodiments the end caps are formed separately from and mounted to the housing, while in other embodiments, one or both of the end caps can be formed as part of the housing. Each of the end caps has a cylindrical extension that is threaded on the outside, with electrical wires passing through the extension. Each extension is designed to fit through a knock-out hole of the junction box, with typical knock-out holes having a ½ to ¾ inch diameter. A nut can then be turned onto the threads of the extension and tightened to mount the power supply to the junction box.

The cylindrical extension is positioned such that the power supply can be mounted in different orientation and the end caps have mounting tabs that allow for the power supply to be mounted adjacent to a junction box at the different orientations. This allows for the use of multiple power supplies with a single junction box, and allows for easier connection from the junction box to the primary. By having multiple power supplies, multiple secondary outputs can be generated from a single primary source, for powering increased numbers of SSL lighting elements.

The power supply can also be more easily connected to the junction box without the need to mount a conduit between the junction box and power supply, and without the need to attach wires at the power supply. The resulting power supply and junction box combination has a smaller overall footprint compared to prior combinations and as a result, takes up less space. Power supplies according to the present invention can be mounted directly to standard power supplies and can be mounted flat, upright or on edge.

In one embodiment, each of the end caps is molded with mounting brackets/tabs for anchoring the power supply to a surface adjacent to the junction box. In these embodiments, the power supply can have a one-piece extruded housing with open ends, with the end caps mounted over the open ends. Power supplies according to the present invention can have primary and secondary wires passing through respective ones of the end caps and electrically connected to electrical components within the housing that convert the primary source to a secondary source. The portion of the wires, electrical components and connection between the wires within the housing are sealed by injecting a potting material into the housing. This helps keep dust and moisture out of the power supply and allows the power supply to operate in wet locations. By having the primary and source wires already connected to the electrical components, primary and source wires are conveniently available for installation. This eliminates the step of connecting primary and source wires at the power supply.

The present invention is described herein with reference to certain embodiments but it is understood that the invention can be embodied in many different forms and should not be construed as limited to the embodiments set forth herein. It is also understood that when an element or component is referred to as being "on", "connected to" or "coupled to" another element or component, it can be directly on, connected to or coupled to the other element or intervening elements may also be present. Furthermore, relative terms such as "inner", "outer", "upper", "above", "lower", "beneath", and "below", and similar terms, may be used herein to describe a relationship of one component or element to another. It is understood that these terms are intended to encompass different orientations of the device in addition to the orientation depicted in the figures.

Although the terms first, second, etc. may be used herein to describe various elements, components and/or sections, these elements, components, and/or sections should not be limited by these terms. These terms are only used to distinguish one element, component, or section from another. Thus, a first element, component, or section discussed below could be termed a second element, component, or section without departing from the teachings of the present invention.

Referring now to the drawings and in particular FIGS. 1-7, one embodiment of a power supply 10 according to the present invention is shown. As described above, the present invention can be used with many different apparatuses and with many different power supplies, but is particularly adapted for use with solid state lighting power supplies attached to standard junction boxes.

Power supply 10 comprises a housing 12 that can have many different shapes and sizes and can be made in many different ways from many different materials. In a preferred embodiment and as more fully described below, the housing has a cross-sectional height and width that allows for at least one of its surfaces to be positioned against the same mounting surface as the junction box when the power supply 10 is mounted to the junction box. In the embodiment shown the housing 12 is made of aluminum and has a one-piece construction with open ends. The housing can be manufactured using many different known methods such as extruding, to form the one-piece construction. In still other embodiments the housing 12 can have multiple pieces mounted together.

The power supply further comprises first and second end caps 14a and 14b that are mounted in a respective one of the open ends of the housing 12, and are preferably mounted having a watertight seal with the housing 12. Many different mounting devices can be used to mount the end caps 14a and 14b to the housing 12, with the preferred mounting device being four mounting screws 16. Different sealing devices/compounds can be included between the end caps 14a and 14b such as gaskets, epoxies, silicones and the like.

First end cap 14a has an end plate 15 sized to fit over the housing opening and a first cylindrical extension 18a integral to said end plate 15 and extending away from the housing 12. The extension 18a having a threaded section 20 down part of its length and a stand-off 22 at its base. Second end cap 14b has a similar end plate 15 and a second cylindrical extension 18b with its own threaded section 20 down part if its length and stand-off 22 at is base. Both the first and second extensions 18a and 18b are hollow to allow wires to pass through to the interior of the housing 12. The internal components of the power supply 10 can be arranged in many different ways to accept many different electrical signals through the end caps 14a and 14b. In the embodiment shown, the first end cap 14a is arranged with primary source wires 24 passing through is extension 18a and coupled to the housing's internal printed circuit board (PCB) 26 (best shown in FIG. 7). The PCB 26 can comprise standard electronic components coupled together in known ways to convert a primary electrical source to a secondary source. End plate 14b is arranged with secondary source wires 28 passing though its extension 18b and coupled to the PCB 26. As more fully described below, the primary wires 24 are coupled to the primary source in the junction box, while the secondary wires 26 are coupled to drive the SSL system.

After the PCB 26 is mounted in the housing 12, and the wires 24, 26 are arranged passing through the desired one of the cylindrical extensions 18a and 18b, the end caps 14a and 14b can be mounted in place over the housing openings. A grommet 30 is then placed around the secondary source wires 28 and arranged within the end portion of the second cylindrical extension 18b to provide a seal between the extension 18b and source wires 28. A potting material is injected into the housing through the first cylindrical extension, to fill the housing 12 with a potting material and encase the housing's internal components. As mentioned above, this keeps contaminants, such as dust and water, from entering the housing, which allows for the power supply to be reliably used in both dry and wet environments.

With the primary and secondary wires encased and passing through their respective one of the cylindrical extension, a power supply is provided with the primary and secondary wires connected at the power supply. This simplifies installation by eliminating the installation step of connecting the primary and secondary wires at the power supply.

FIGS. 8 and 9 show first end cap 14a in more detail and FIGS. 10 and 11 show second end cap 14b in more detail. Referring first to FIGS. 8 and 9, first end cap 14a has its previously described cylindrical extension 18a having a threaded section 20 and stand-off 22. The end cap 14a also has screw holes 31 sized and located to allow mounting screws 16 (shown in FIGS. 1-7) to pass for mounting the end cap 14a to the housing 12. The end cap 14a also has first and second mounting tabs 32a and 32b arranged for mounting the power supply to a surface adjacent to the junction box. A raised edge 33 is included on the inside surface of the end cap 14a to help in providing a seal between the end cap 14a and housing 12.

Depending on the power supply orientation, after mounting the power supply 10 to a junction box the first tab 32a can abut the surface that the junction box is mounted to. A mounting screw (not shown) can then be screwed into the mounting surface through the first mounting tab opening 34a to mount the power supply in place. In other power supply orientations the second mounting tab 32b can abut the junction box surface and a screw can be used to mount the power supply in place through the second mounting tab opening 34b.

The first mounting tab 32a is included on first end cap extension 35 that holds the first mounting tab 32a above the outside surface of the power supply housing 12 and the cylindrical extension 18a so that it is accessible past the cylindrical extension 18a. This allows access to the mounting tab 32a that would otherwise be hidden behind the cylindrical extension 18a. The second mounting tab 32b is also arranged so that it is not behind the cylindrical extension so that it is also accessible for mounting the power supply.

Referring now to FIGS. 10 and 11, the second end cap 14b has similar first and second mounting tabs 36a and 36b, with similar first and second mounting tab openings 38a and 38b and similar raised edge 33. These features, however, are arranged in different locations on second end cap 14b because the first and second end caps 14a and 14b are arranged in opposite openings in the power supply housing 12. The first mounting tab 36a of the second end cap 14b is on the opposite side of end cap 14b compared to mounting tab 32a of first end cap 14a. The second mounting tab 36b is also in a different location to allow access past the cylindrical extension 18b for mounting purposes. With these different mounting tab arrangements, first mounting tabs 32a and 36a will be against the same surface, and mounting tabs 32b and 36b will be against the same surface, depending on the power supply orientation. Each of the mounting tabs 36a and 36b of the second end cap can be similarly used with mounting screws and first and second mounting tab openings 38a and 38b to mount the power supply in place.

The stand-off 22 of each cylindrical extension has a larger diameter than the threaded section 20. The threaded section 20 is sized to fit within a standard junction box knock-out opening, such as approximately ½ or ¾ inch. The stand-off 22 prevents the particular cylindrical extension from passing completely into the junction box knock-out opening. This prevents the junction box from being positioned too close to the power supply such that it blocks access the desired mounting tabs. The stand-off 20 can have many different shapes, but as shown is hexagonal to allow for engagement by a standard wrench during installation.

Figure 12A:
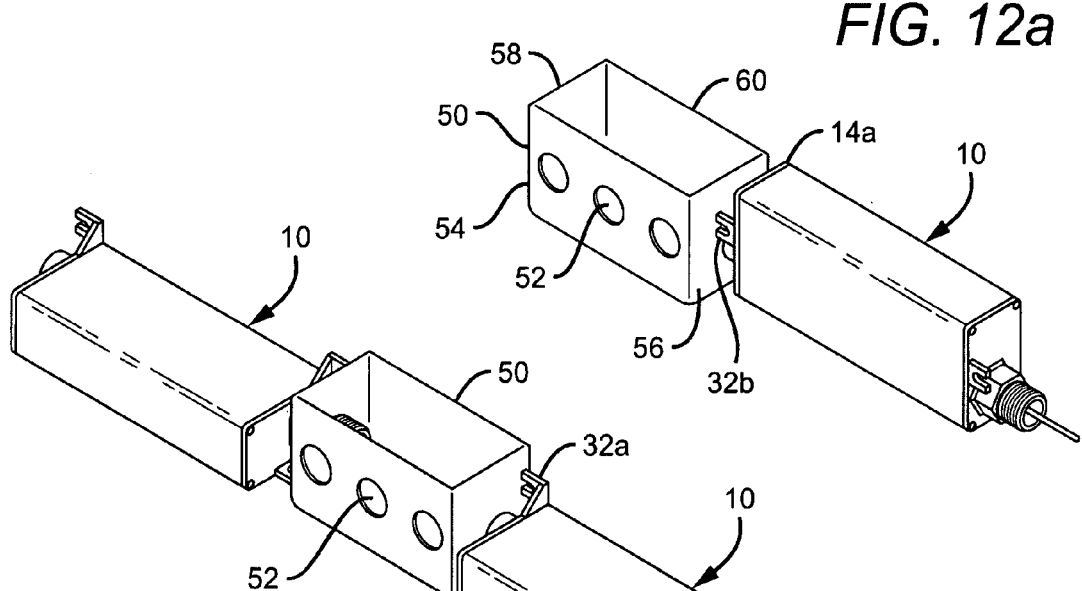
FIGS. 12a-12d show different mounting arrangements for a power supply according to the present invention, to a dry location junction box.
Figure 12B:

The power supply according to the present invention can be used with many different junction boxes having many different numbers of holes or knock-outs having the same or different sizes and located in different places. FIGS. 12a-12b show the different numbers of power supplies according to the present invention mounted in different ways to a junction box 50. Junction box 50 is a conventional dry location junction box having three holes or knock-outs 52 along the junction box's first vertical surface 54, and one knockout 52 in opposing second and third surfaces 56 and 58. It is understood that fourth vertical surface 60 can also have one or more holes or knock-outs. Knock-outs are known in the art as a section of a junction box that can be removed by striking to provide an access hole to the junction box.

Referring now to FIG. 12a, the knock-out in the third surface 58 can be removed to provide a hole (typically ½ or ¾ inch diameter) for the connection to the primary source within the junction box. The cylindrical extension (18a in FIGS. 1-7) of end cap 14a is sized to fit closely within the hole left by the knock-out and to be inserted into the hole along with the primary source wires (24 in FIGS. 1-7). A nut can then be turned onto the threaded section of the extension from inside the junction box and tightened to mount the power supply to the junction box with a portion of the second vertical surface sandwiched between the nut and standoff 22. The primary source wires can then be electrically connected to the primary power (typically 100-240 VAC) within the junction box 50 using conventional electrical wire connectors. The power supply 10 accepts the power signal from the primary source and converts it to a signal compatible with solid state lighting systems, with the power source 10 preferably converting the primary source to a secondary source of 12 VDC. This secondary source is conducted to the desired solid state lighting system along secondary source wires 28.

Secondary source wires can be arranged in many different ways with protections such as conventional conduits. The secondary source wires are, however, preferably provided as industry standard class 2 cables that do not require conduit. This further simplifies installation by eliminating the step of installing secondary source wire conduits.

Power supply 10 is oriented on its edge and arranged such that it can be mounted to the same surface as the junction box 50 using mounting tabs 32a and 36a (shown in FIGS. 1-7), with tab 32a hidden behind the housing 12 and tab 36a hidden behind the second cylindrical extension 18b (shown in FIG. 12b). The cover can then be placed over the junction box to protect the internal wiring and connectors and the system is ready for operation.

As mentioned above, the power supply according to the present invention is modular in that multiple power supplies can be connected to a single junction box to accept primary power and convert it to SSL system compatible power. One of the limiting factors in how many power supplies can be used is the space around the junction box and the size or capacity of the junction box. There may not be enough physical space around the junction box, and industry standards may limit the number of connections to the primary source that are allowable within a particular junction box. For example, Underwriters Laboratories (UL) requirements can limit the number of connections within a particular junction box by the physical capacity of the box; e.g. the box must have 2.25 inches per AWG 14 wire per NEC code. Junction box 50 has a size that typically limits the number of primary connections to two (2) because of its size.

Figure 12C:
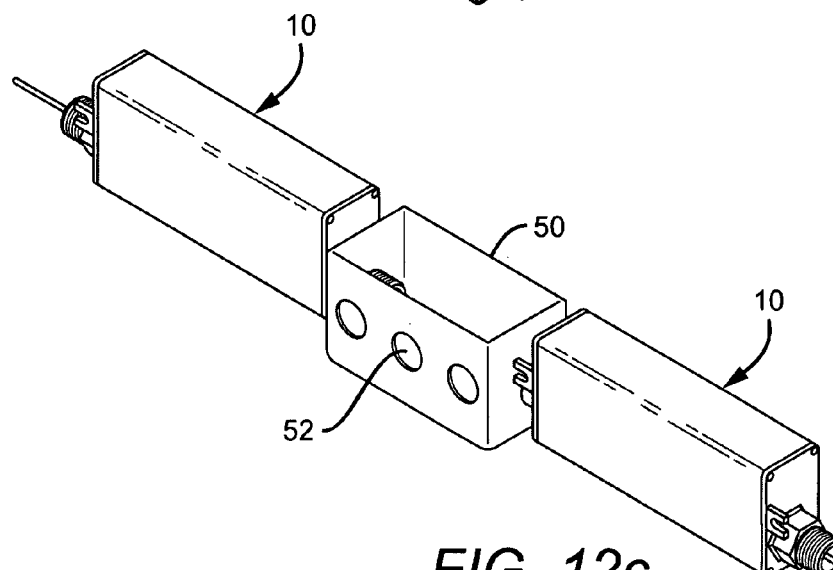
Figure 12D:
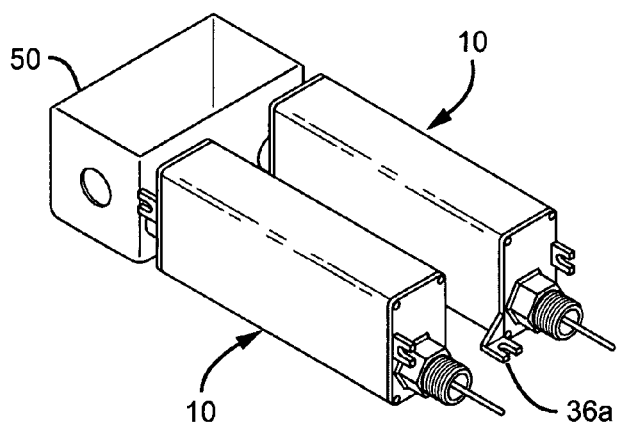

FIGS. 12b and 12c show two power supplies 10 mounted to the junction box 50 and with the power supply primary source wires from each coupled to the primary source within the junction 50. Each is mounted the same way as power supply 10 in FIG. 12a, with the appropriate knock-out removed at second and third vertical surfaces 56 and 58 and the first extension 18a from each power supply inserted into a respective knock-out hole. A nut can be turned onto the threaded section of each extension to mount each power supply 10 to the junction box 50. The primary source wires from each power supply can then be connected to the primary source and a SSL compatible power signal is provided from each power supply at its respective secondary source wires.

The power supplies 10 are oriented on their sides compared to the edge orientation shown in FIG. 12a. The first extensions 18a from each power supply are positioned such that the power supplies can still be mounted to the same surface as the junction box 50, using second mounting tabs 32b and 36b. FIG. 12c shows a similar arrangement for junction box 50 with two power supplies 10 mounted to the second and third vertical surfaces 56 and 58 as described above. The power supplies, however, are oriented on edge and mounted to the same surface as the junction box by first mounting tabs 32a and 36a (hidden). FIG. 12c shows still another junction box 50 and two power supplies 10 with the two power supplies 10 mounted to two of the knockouts in first vertical surface 54. The power supplies 10 can then be mounted to the same surface as the power supply by first mounting tabs 32a and 36a.

Power supplies according to the present invention can be either edge or side oriented as desired and the cylindrical extension mounting tabs positioned such that the power supply can be mounted to the junction box surface in either orientation. It is understood that there are other alternative arrangements for junction box 50 and one or two power supplies 10 beyond those shown with the power supplies mounted to different junction box vertical surfaces in different orientations.

Figure 13A:
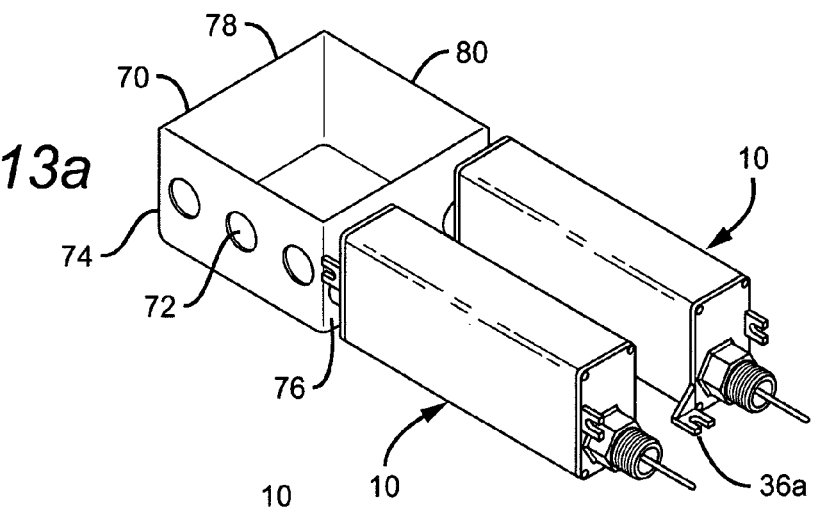
FIGS. 13a-13c show different mounting arrangements for a power supply according to the present invention, to a larger dry location junction box.
Figure 13B:
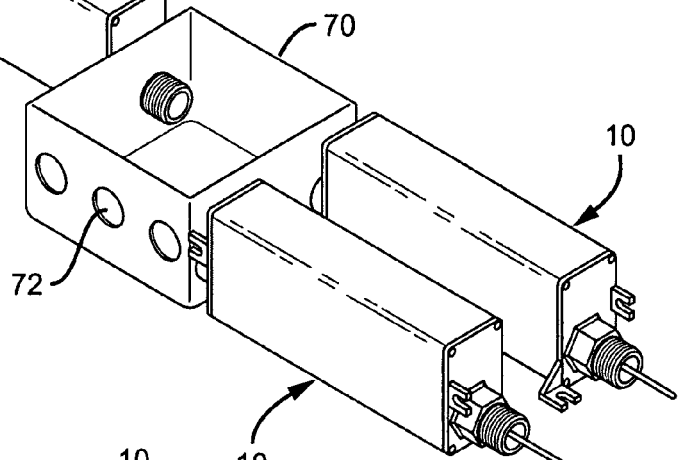
Figure 13C:
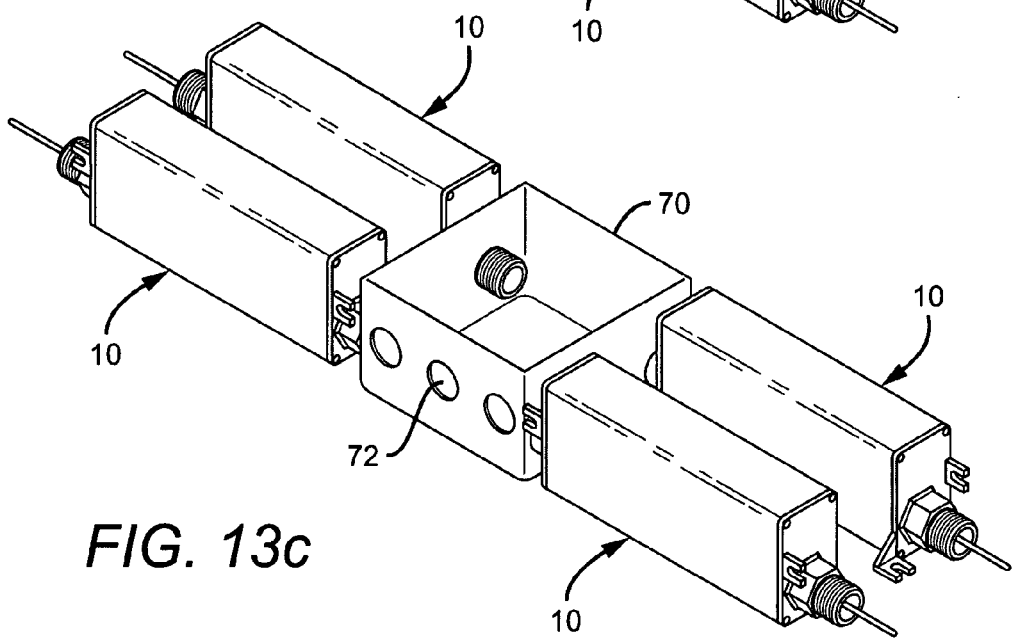

FIGS. 13a-13c show a larger conventional junction box 70 typically used in dry locations and having a capacity to allow for up to four connections to a primary source. The junction box 70 has up to three knock-outs 72 on each of its first, second, third and fourth vertical surfaces 74, 76, 78, 80. Up to four power supplies can be mounted to the junction box 70 to different surfaces and in different orientations. FIG. 13a shows two power supplies 10 mounted to the junction box 70 to two of the knock-out holes along second vertical surface 76 as described above with the primary source wires from each coupled to the primary source within the junction box 70. The power supplies 10 are edge oriented and can be mounted to the junction box surface using first mounting tabs 32a and 36a. FIG. 13b again shows two power supplies 10 mounted to knock-outs in the second vertical surface 76 and a third power supply mounted to at a knock-out hole in the third vertical surface 78. FIG. 13c shows still a fourth power supply mounted to a second knock-out hole in the third vertical surface 78. The third and fourth power supplies can also be mounted to same surface as the junction box by first mounting tabs 32a (hidden) and 36a. It is understood that up to four power supplies coupled to the junction box 70 can be mounted to different vertical surfaces in different orientations, with the side oriented power supplies mounted to the same surface as the junction box using second mounting tabs 32b and 36b.

Figure 14A:
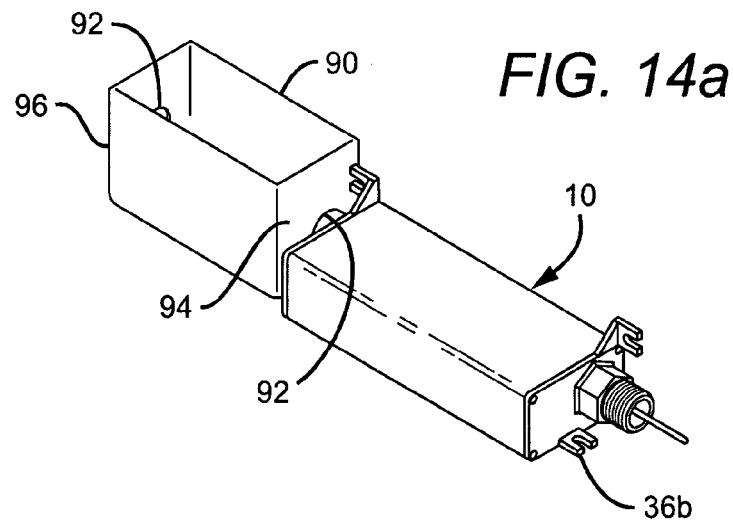
FIG. 14a-14c show different mounting arrangements for a power supply according to the present invention, to a wet location junction box.
Figure 14B:
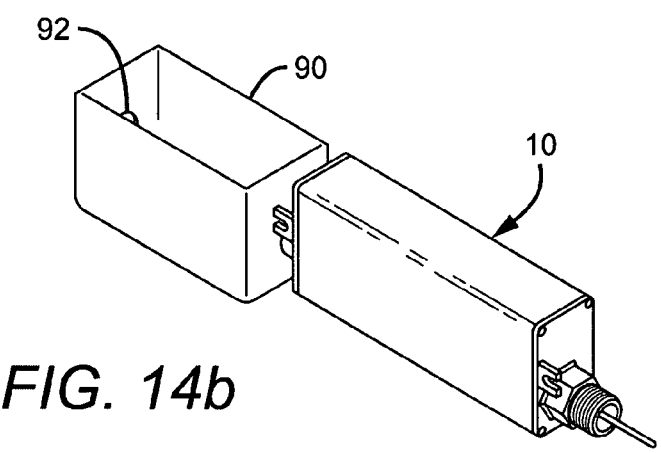
Figure 14C:
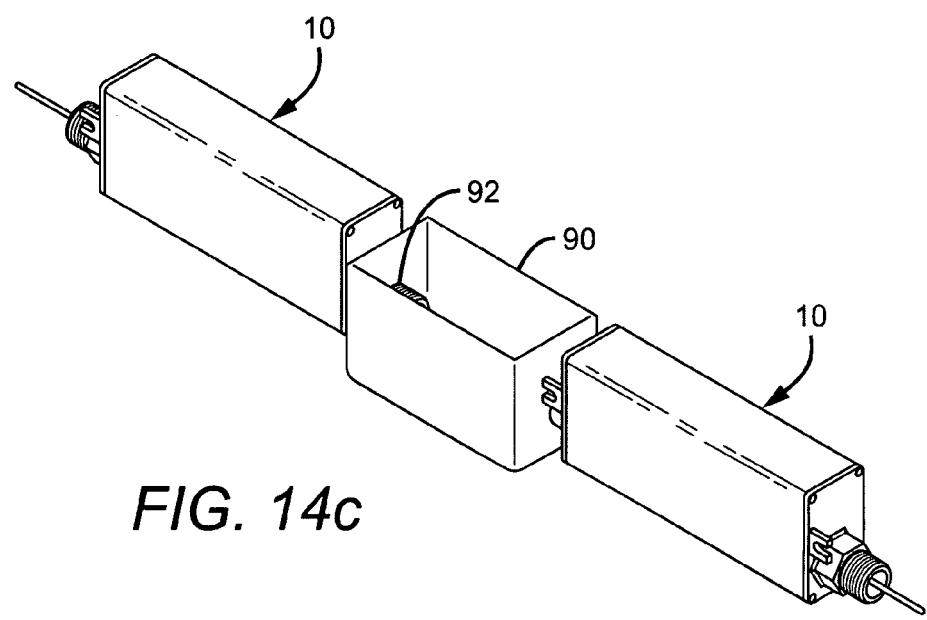

Power supplies according to the present invention can be used with different types of junction boxes, and FIGS. 14a-14c show power supplies 10 mounted to a junction box 90 that is typically used for wet locations and is sized to accommodate two power supplies 10. The junction box has two holes (knock-outs) 92, one on the second vertical surface 94 and another on the third vertical surface 96. Referring to FIG. 14a, a single power supply 10 can be mounted in side orientation at second vertical surface 94, with the power supply mounted in place by second mounting tabs 32b (hidden) and 36b. FIG.

14b also shows a single power supply 10 mounted in edge orientation at second vertical surface 94, with the power supply mounted in place by first mounting tabs 32a and 36a. In FIG. 14c two power supplies 10 are mounted to the junction box 90, with one power supply 10 at the second vertical surface 94 and the other at the third vertical surface 96. Both power supplies can be mounted in edge orientation at first mounting tabs 32a and 36a, although it is understood that they can be mounted in other orientations.

Figure 15A:
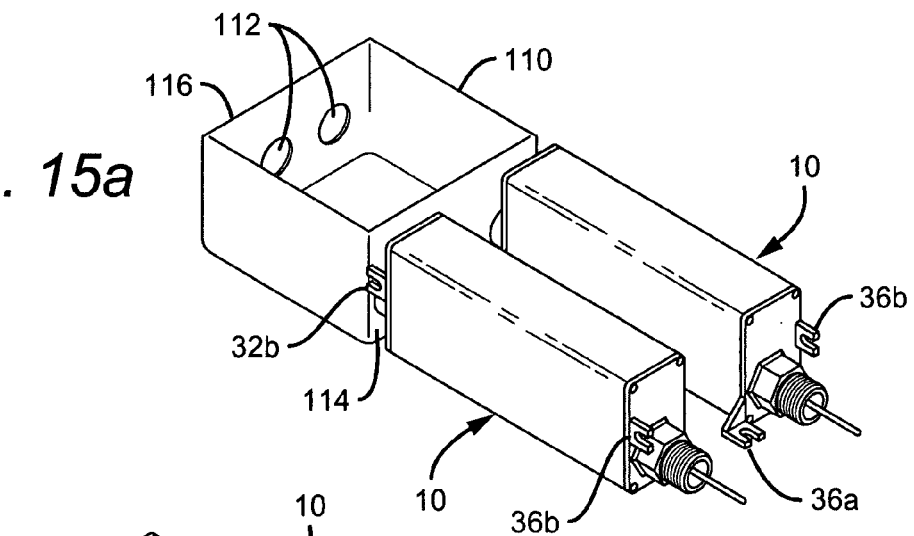
FIG. 15a-15c show different mounting arrangements for a power supply according to the present invention, to a larger wet location junction box.
Figure 15B:
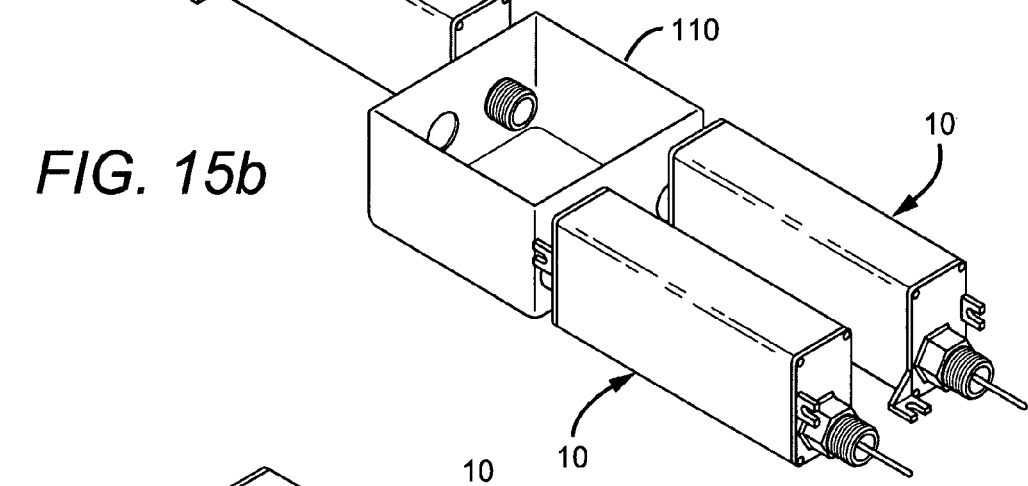
Figure 15C:
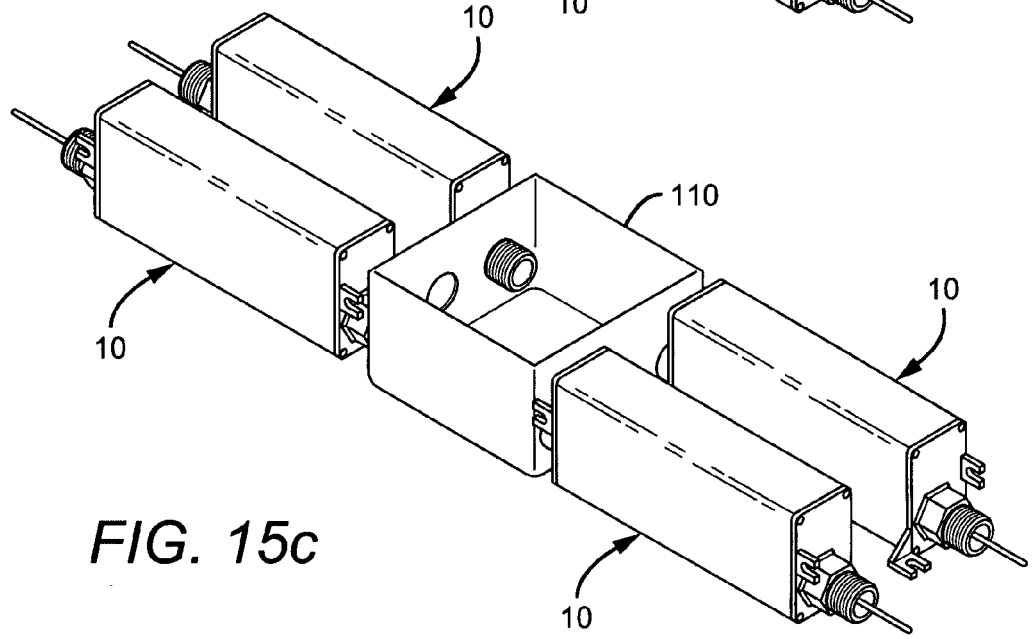

FIGS. 15a-15c show still another embodiment of a junction box 110 that can be used with up to four power supplies 10 according to the present invention. The junction box can be used in wet locations and has a capacity for up to four primary source connections. It has two holes (or knock-outs) 112 on its second vertical surface 114 and two holes on its third vertical surface 116. FIG. 15a shows two power supplies 10 mounted in edge orientation to the holes in the second vertical surface 114. FIG. 15b shows three power supplies 10 mounted in edge orientation, with two mounted to the holes 112 in the second vertical surface 114, and the third mounted to one of the holes in the third vertical surface 116. FIG. 15c shows a power supply 10 mounted to each of the holes 112 in the junction box 110. Each power supply 10 in FIGS. 15a-15c can be mounted in place at first mounting tabs 32a (hidden) and 36a, although it is understood that the power supplies can be side oriented in different embodiments and can be mounted at second mounting tabs 32b and 36b.

Figure 16:
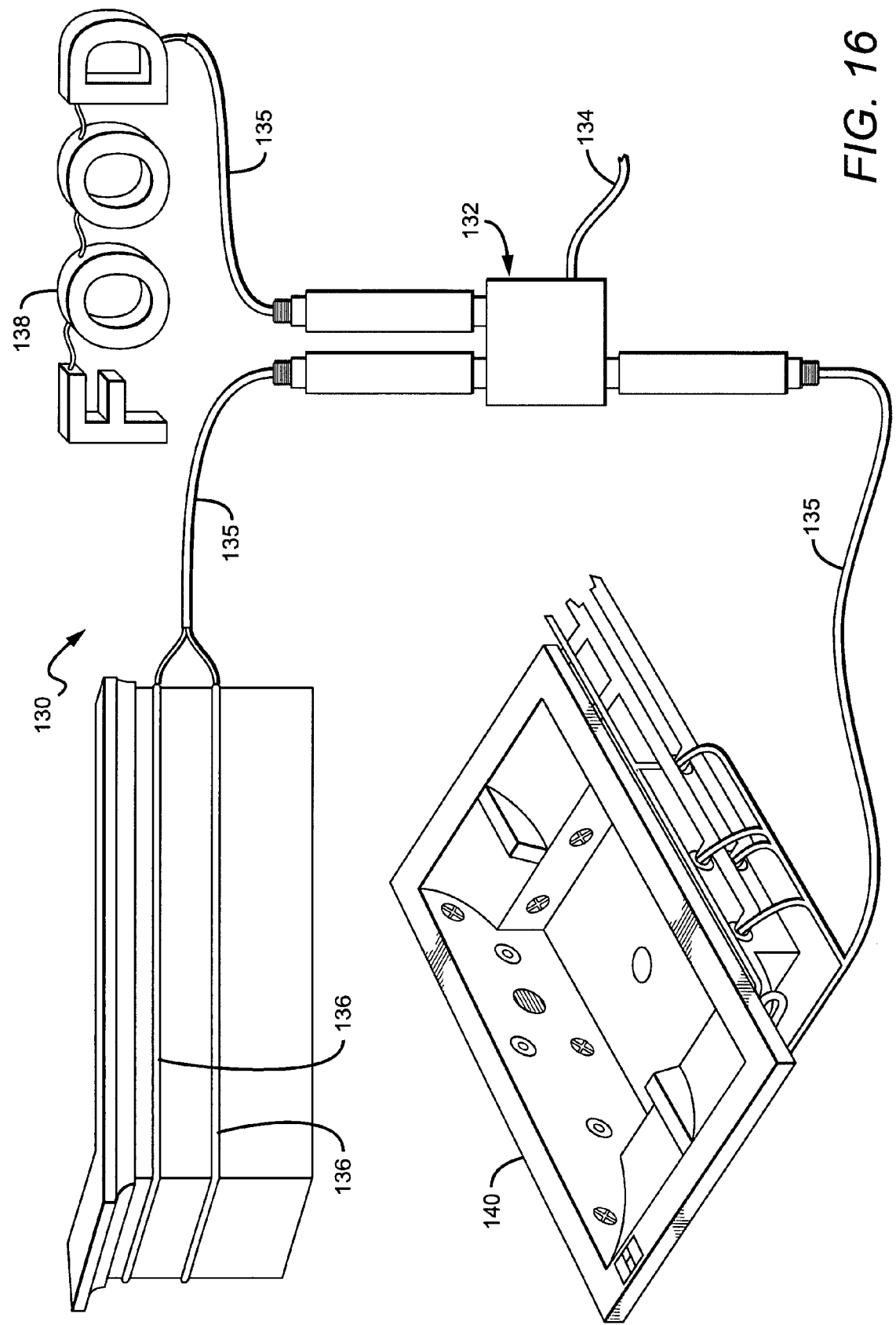
FIG. 16 shows different SSL systems that can be driven by power supplies according to the present invention.

The power supplies according to the present invention can be used to drive many different types of solid state lighting systems, and FIG. 16 shows one embodiment of an electrical system 130 showing a junction box and power supply combination driving some examples of possible solid state lighting systems. The system 130 comprises a junction box 132 that accepts a primary power source along primary conductors 134. Power supplies 10 according to the present invention are mounted to the junction box using the mounting methods described above, and each of the primary source wires are connected to the primary source provided to the junction box along conductors 134. Each of the power supplies 10 converts the primary source (100-240 VAC) to solid state lighting compatible power (12 VDC) that is conducted from each of the power supplies 10 along its respective secondary source wires 135. One of the power supplies 10 can be used to drive architectural perimeter lighting 136, while another power supply can be used to drive LED illuminated channel letters 138. Still another power supply can be used to drive lighting for a pool/spa 140. These are only a few of the solid state lighting systems that can be driven by power supply 10 and it is understood that the different power supplies can be used to drive the same type of solid state lighting system. For example, the different power supplies 10 can be used to drive different sections of perimeter lighting in the case where one power supply may not be able to power all the perimeter lighting.

Although the present invention has been described in considerable detail with reference to certain preferred configurations thereof, other versions are possible. Therefore, the spirit and scope of the appended claims should not be limited to their preferred versions contained therein.

We claim:

1. A modular power supply for mounting to a junction box, comprising: a housing holding internal electronic components, said housing comprising at least one end cap; a first extension integral to said at least one end cap, said extension comprising an opening to an interior of said housing; primary wires passing from the interior of said housing through said first extension, wherein said first extension is positioned so that said power supply is capable of being mounted to a mounting surface of said junction box when said power supply is at different orientations; and a plurality of mounting tabs integral to said at least one end cap for mounting said power supply.

2. The power supply off claim 1, wherein said mounting tabs are arranged to allow said power supply to be mounted to said mounting surface of said junction box when said power supply is edge or side orientated.

3. The power supply of claim 1, wherein said first extension comprises a threaded section.

4. The power supply of claim 3, wherein said threaded section accepts a nut that is turned on said threaded section to mount said power supply to said junction box.

5. The power supply of claim 3, wherein said first extension further comprises a stand-off.

6. The power supply of claim 1, further comprising a second extension integral to a second end cap and secondary source wires passing out from inside said housing through said second extension.

7. The power supply of claim 6, wherein said electronic components convert an electrical signal on said primary wires and transmits a converted signal on said secondary source wires.

8. The power supply of claim 1, wherein at least one of said mounting tabs includes a tab extension.

9. The power supply of claim 1, further comprising a second extension integral to a second end cap, said second extension comprising a hole opening to the interior of said housing, secondary source wires passing out of said housing through said second extension.

10. The power supply of claim 9, said primary and secondary wires electrically coupled to said electronic components, said electronic components converting an electrical signal on said primary wires and transmitting a converted signal on said secondary source wires.

11. The power supply of claim 10, wherein said electronic components, portions of said primary and secondary wires within said housing are encased.

12. The power supply of claim 11, wherein said encased electronic components and portions of said primary and secondary wires are moisture resistant.

13. A system for providing power to a lighting system, comprising: a junction box mounted to a mounting surface and comprising a bottom surface adjacent to said mounting surface, said junction box capable of accepting an electrical conductor passing into an interior of said junction box, wherein said electrical conductor carries a first electrical signal; and a power supply capable of accepting said first electrical signal and converting said first electrical signal to a second electrical signal capable of powering a lighting system, said power supply comprising: a housing comprising at least one end cap; a first extension integral to said at least one end cap, said first extension passing through a hole in said junction box wherein said first extension is positioned so that a surface of said housing is at the same level as said bottom surface when said power supply is at different orientations; and a plurality of mounting tabs integral to said at least one end cap for mounting said rower supply.

14. The system of claim 13, wherein said power supply is capable of mounting adjacent to said junction box at said mounting surface when said power supply is at different orientations.

15. The system of claim 13, wherein said second electrical signal is capable of powering solid state lighting systems.

16. The system of claim 13, said mounting tabs utilized for mounting said power supply to said mounting surface when said power supply is at different orientations.

17. The system of claim 13, wherein said first extension comprises a threaded section.

18. The system of claim 17, wherein said threaded section accepts a nut that is turned down on said threaded section to mount said power supply to said junction box.

19. The system of claim 17, wherein said first extension further comprises a stand-off.

20. The system of claim 13, further comprising primary wires passing from said junction box to said housing through said first extension and carrying said first electrical signal.

21. The system of claim 20, further comprising a second extension integral to a second end cap and secondary source wires passing out from inside said housing through said second extension carrying said second electrical signal.

22. The system of claim 21, further comprising electronic components within said housing, said primary and secondary wires electrically coupled to said electronic components, said electronic components converting said first electrical to said second electrical signal.

23. The system of claim 22, wherein said electronic components, portions of said primary and secondary wires within said housing are encased in a moisture resistant material.

24. The system of claim 13, further comprising a second power supply mounted to said junction box.

25. The system of claim 24, wherein said second power supply is capable of accepting said first electrical signal and converting said first electrical signal to a second power supply second electrical signal capable of powering a lighting system.

26. The system of claim 25, wherein said second power supply second electrical signal is capable of powering solid state lighting systems.

27. The system of claim 26, wherein said second power supply comprising a housing comprising at least one end cap; and a first extension integral to said at least one end cap, said first extension passing through a hole in said junction box wherein said first extension is positioned so that a surface of said housing of said second power supply is at the same level as said bottom surface of said junction box when said second power supply is at different orientations.

28. The power supply of claim 13, comprising of additional power supplies each of which is capable of accepting said first electrical signal and converting said first electrical signal to a corresponding electrical signal capable of powering a corresponding lighting system, each also comprising a housing comprising at least one end cap and a first extension integral to said at least one end care.

29. The power supply of claim 28, wherein each said first extension is positioned so that a surface of said housing is at the same level as said bottom surface of said junction box when said power supply is at different orientations.

30. A power supply housing end cap, comprising:
an end plate capable of being mounted to a power supply housing;
a cylindrical extension integral to said end plate and sized to fit within a junction box hole;
an access hole in said end plate aligned with said cylindrical extension;
mounting tabs integral to said end plate and arranged to allow mounting of said housing to a mounting surface of said junction box when said end plate is mounted to said power supply housing and said cylindrical extension is fitted within said junction box hole.

31. The end cap according to claim 30, further comprising a gasket to make a watertight seal with said power supply housing.

32. The end cap of claim 31, wherein said gasket comprises rubber or silicone.

33. The end cap of claim 30, wherein said cylindrical extension is sized to accept a grommet and wires with a watertight seal between said cylindrical extension, grommet and wires.

34. The end cap of claim 30, wherein said cylindrical extension is sized to accept wires and to allow potting material to be injected through said cylindrical extension.

* * * * *

UNITED STATES PATENT AND TRADEMARK OFFICE
CERTIFICATE OF CORRECTION

PATENT NO. : 7,714,225 B2
APPLICATION NO. : 11/607560
DATED : May 11, 2010
INVENTOR(S) : Thomas C. Sloan et al.

Page 1 of 1

It is certified that error appears in the above-identified patent and that said Letters Patent is hereby corrected as shown below:

Column 12, Claim 28, Line 10, is written as: to said at least one end care.

It should read as: to said at least one end cap.

Signed and Sealed this

Twentieth Day of July, 2010

David J. Kappos
*Director of the United States Patent and Trademark Office*